United States Patent [19]

Bernstein

[11] Patent Number: 5,583,925
[45] Date of Patent: Dec. 10, 1996

[54] AUTOMATIC THREE-WAY CALLING FEATURE FOR A TELECOMMUNICATIONS SYSTEM

[75] Inventor: Lawrence Bernstein, Short Hills, N.J.

[73] Assignee: Lucent Technologies, Inc., Murray Hill, N.J.

[21] Appl. No.: 408,664

[22] Filed: Mar. 22, 1995

[51] Int. Cl.$^6$ ........................................ H04M 3/56
[52] U.S. Cl. .................... 379/202; 379/216; 379/88; 379/205; 379/355
[58] Field of Search ........................ 379/202, 201, 379/355, 88, 216, 205, 204

[56] References Cited

U.S. PATENT DOCUMENTS

4,870,686  9/1989  Gerson et al. ................... 379/355
5,182,766  1/1993  Garland .......................... 379/355
5,315,649  5/1994  Foster et al. ..................... 379/355

Primary Examiner—Ahmad F. Matar
Attorney, Agent, or Firm—Frederick B. Luludis

[57] ABSTRACT

A facility is disposed in a telecommunications network which, advantageously, establishes a conference (N-way) call more efficiently than was done priorly. Specifically, a caller may establish a N-way call by dialing a code representing a sequence of speed dial codes respectively associated with the telephone numbers of the conferees that will be involved in the N-way call, rather than dialing each such telephone number. The facility, responsive to receipt of the dialed code, identifies the associated sequence of speed dial codes and places a call to each of the telephone numbers associated with those codes. In this sense, one code represents a plurality of telephone numbers.

7 Claims, 6 Drawing Sheets

| 404 | 403 | 402 |
|---|---|---|
| 908-555-1234 | 1 | JOHN BROWN |
| 212-555-8976 | 2 | JOE BAKER |
| 201-555-3372 | 3 | LARRY B |
| 201-555-1492 | 4 | SAM FUNN |
| 908-555-6008 | 5 | JOHN SMITH |
| *3*5 | 35 | NULL |
| *2*4*5 | 24 | NULL |
| ... | ... | ... |
| 908-949-3000 | 16 | AT&T |

AUTOMATIC THREE-WAY CALLING FEATURE FOR A TELECOMMUNICATIONS SYSTEM

FIELD OF THE INVENTION

The invention relates to telecommunications systems and more particularly relates to establishing a conference call.

BACKGROUND OF THE INVENTION

It is often the case that a telephone user establishes periodically a conference call that involves the same conferees. This is especially true in a business setting where the same people are frequently involved in the same conference call. Also, one of the conferees is usually designated as the person who will be responsible for "setting up" the conference call. A conference call may be established by dialing the telephone number of each person that is to be involved in the conference call and when that person answers the telephone call directing an associated telecommunications system to switch the call into the conference connection. The conference connection is usually placed in a "hold" state during the time that each such call is being established.

It is apparent from the foregoing discussion that the procedure for "setting up" a conference call is somewhat burdensome and inefficient, especially when the conference connection will involve the same people.

SUMMARY OF THE INVENTION

The foregoing problem is addressed by arranging a telecommunications network so that a caller may establish a conference call more efficiently than was done heretofore. Specifically, in accord with an aspect of the invention, a caller establishes an N-way conference call by entering a sequence of speed dial codes respectively associated with the telephone numbers of the conferees that will be involved in the conference call, rather than entering each telephone number. Alternatively, the caller may enter just one code which represents the sequence of speed dial codes, thereby achieving a higher level of efficiency. More particularly, a telecommunications system is illustratively arranged, in accord with an aspect of the invention, such that, responsive to receipt of a telephone call from a subscriber and a sequence of speed dial codes via the associated call connection, it identifies the telephone numbers respectively associated with the speed dial codes, places a telephone call to each of the telephone numbers and conferences each such call with the subscriber's call.

Alternatively, if, in accord with an aspect of the invention, a code other than a speed dial code is received, then the code is translated into an associated sequence of speed dial codes. The telecommunications system then identifies the telephone numbers associated with respective ones of the speed dial codes, and then places a telephone call to each of the telephone numbers and conferences each such call with the subscriber's call.

Further aspects of the invention will be readily apparent in the following detailed description.

DETAILED DESCRIPTION

Figure 1:
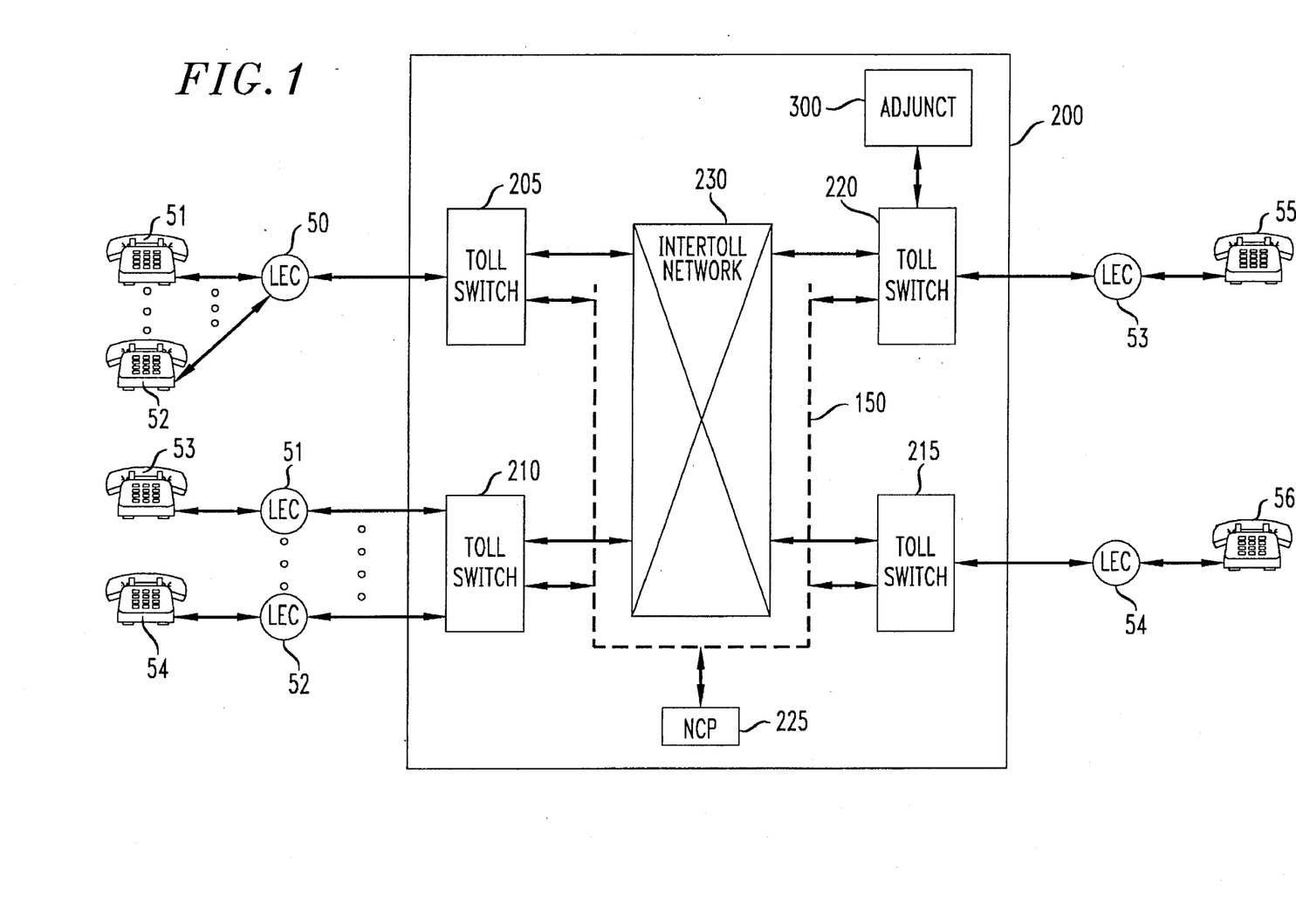
FIG. 1 is a broad block diagram of a telecommunications system in which the principles of the invention may be practiced.

In an illustrative embodiment of the invention, communications network 200, FIG. 1, may be, for example, a public switched telephone network, such as, for example, the well-known AT&T network, that provides long distance telephone services for its subscribers, such as the subscribers associated with telephone stations S1 through S6. Network 200 includes, inter alia, a plurality of Toll Switching (TS) offices, four of which, 205, 210, 215 and 220, are shown in the FIG. Such switches may be any one of the well-known types of switching equipment, and include, for example, the No. 4ESS (Electronic Switching System) and No. 5ESS available from AT&T. (4ESS and 5ESS are trademarks of AT&T). It is seen from the FIG. that the toll switches are connected via a so-called inter-toll network represented by block 230. A toll switch may also be connected to a number of Central Offices (CO), e.g., COs 51 . . . 52 as is the case for TS 210. The operation of a central office is well-known and will not be discussed herein. However, it suffices to say that a CO, e.g., CO 50 through 54, is arranged to send to an associated switch of network 200 a telephone call originated at a calling telephone station set (herein the calling party), e.g., one of the stations sets S1 through S6, which has dialed a particular long distance telephone number. A CO is also arranged to connect a call that it receives from an associated network 200 switch to a called telephone station set, e.g., station S4.

The toll switches of network 200 are also interconnected via data link 150, which may be, for example, the well-known System Signaling 7 (SS7) network. Network 150 is arranged so that the toll switches may exchange data messages with one another to establish a connection between a calling telephone station, e.g., S1, and a called station, e.g., S4, via network 200. Network 200 further includes a number of centralized data bases commonly referred to as Network Control Points (NCPs), one of which is shown in the FIG., namely NCP 225. Such NCPs are strategically positioned at various locations within network 200 to support various network 200 features such as the well-known 800 telephone number service.

Specifically, a toll switch, e.g., TS 205, responsive to receipt of a call associated with an 800 service number dialed by a caller, sends a query message to one of the NCPs, e.g., NCP 225. The query message includes a number of fields respectively identifying, inter alia, TS 205, a destination group index, the dialed 800 number, and a call identifier. The destination group index is used to route the message to the appropriate NCP. The call identifier is used to associate a subsequent NCP response message with the correct call. Assume that the message is routed to NCP 225. Upon receipt of the message, NCP 225, in a conventional manner, translates the 800 telephone number contained in the message into a destination telephone number, e.g., a telephone number associated with adjunct 300. NCP 225 then forms a response message comprising, inter alia, (a) the identity of switch 205 so that the message may be routed thereto via network 150, (b) a destination telephone number so that the associated call may be routed to its intended destination and (c) a call identifier equivalent to the call identifier contained in the query message. Upon receipt of the response message, TS 205 translates the destination telephone number into a destination toll switch identifier (switch address) and forwards the associated call thereto via intertoll network 220. In doing so, switch 205 sends a conventional call set-up message to the destination switch, e.g., TS 220, via SS7 network 150 to alert the destination switch that a call has been forwarded thereto. The call setup message includes, inter alia, (a) the identity of switches 205 and 220, (b) destination telephone number and (c) the Automatic Identification Number (ANI) associated with the calling telephone station set. TS 220, in turn and in a conventional manner, derives, as a function of the information contained in the call set-up message, the routing for the newly-received call. That is, TS 220 routes the call to the customer associated with the dialed 800 service number, which customer is assumed to be adjunct 300. Thus, for the instant example, the call is forwarded to adjunct 300 via communications path 301.

In an illustrative embodiment of the invention, communications path 301 may be, for example, a digital communications path having a plurality of digital voice channels for establishing a voice connection between adjunct 300 and TS 220. One of the channels may be used in a conventional manner to exchange signaling messages between adjunct 300 and TS 220. Adjunct 300, more particularly, may include one or more processors as well as a conventional database system for storing subscriber records. Each such record identifies, in accord with an aspect of the invention, a list of speed dialing codes associated with a respective subscriber's ANI.

Figure 2:
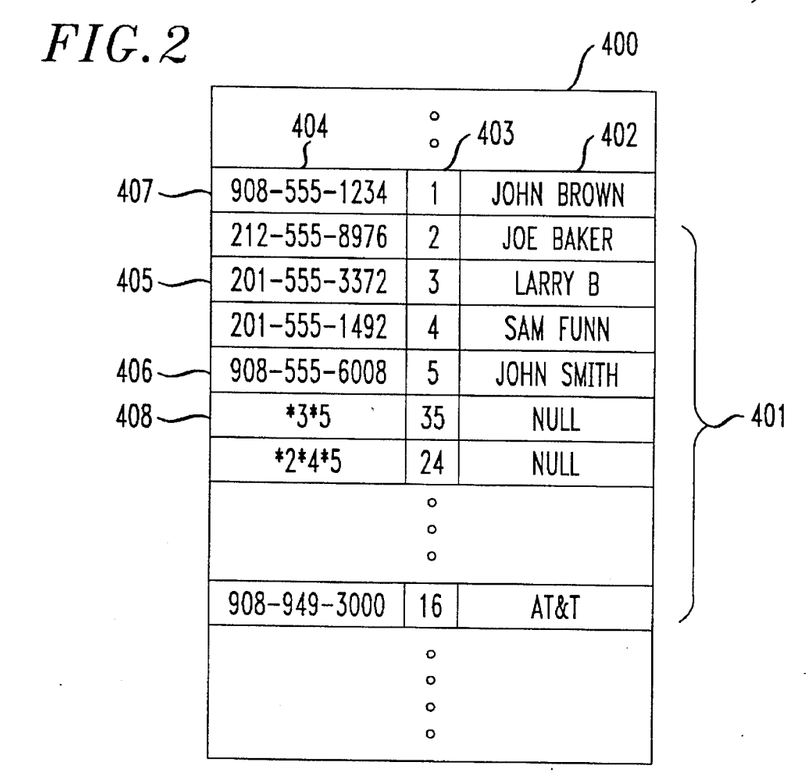
FIG. 2 is an illustrative example of a subscriber record.

With the foregoing in mind, assume at this point that the user associated with station S1 subscribes to the inventive service. As a result of that subscription, a list of speed dialing codes associated with the station S1 subscriber is stored in adjunct 300 at a memory location indirectly identified by the ANI associated with station S1. An illustrative example of such a record is shown in FIG. 2. It is seen that an entry in a record (list) includes a telephone number and associated speed dial code and may also include a name, as is shown for record 401. More particularly, an entry in record 401 comprises three fields for storing a name (402), associated speed dial code (403) and the telephone number (404) associated with the speed dial code entered in field 403. In keeping with the spirit of the invention, a subscriber is not limited to a specific number of entries. However, for the sake of being able to properly manage database 400, a subscriber may be billed for each entry that exceeds an initial subscription, e.g., 15 entries.

Also assume that the station S1 subscriber (hereinafter "subscriber") desires to establish a conference call involving station S1 and telephone station sets S2 and S4. Assume that the telephone numbers for the station sets S2 and S4 are stored in entries 405 and 406, respectively. The subscriber may establish the desired connection by dialing via station S1 the telephone number (1-800-adjunct) associated with adjunct 300. In a conventional fashion, LEC 50, TS 205 and TS 220 establish a connection between adjunct 300 and station S1 via intertoll network 230. In doing so, TS 220 forms a signaling message containing, inter alia, (a) the station S1 ANI, (b) call identifier, (c) dialed telephone number and (d) identity of a selected voice channel that is being used to forward the call to adjunct 300. TS 220 then sends the message to adjunct 300 via the aforementioned signaling channel. In addition, the call is forwarded to adjunct 300 via the selected path 301 voice channel. Upon receipt of the call, adjunct 300 determines, based on the calling party's ANI if the caller is a subscriber of the inventive service. Adjunct 300 may do this by indexing a so-called originating-telephone-number table (not shown) that is stored in an associated database using the caller's ANI. If the caller's ANI is stored at the indexed location, then adjunct 300 assumes that the caller is a subscriber of the inventive service. If the result of the latter determination is positive, then adjunct 300 returns an alerting tone (e.g., a second dial tone) to the subscriber via the selected voice channel. At that point, the subscriber may enter (dial) the speed dial codes associated with the telephone numbers assigned to the station sets that will be involved in the conference connection, i.e., the speed codes shown in entries 405 and 406 (FIG. 2).

To do this, the subscriber may enter (dial) instructions—illustratively #c*3*5—directing adjunct 300 to create the specified conference connection, where "#c" is the instruction for a conference connection and *3 and *5 are the speed dial codes identifying the telephone numbers that are to be included in the conference connection. Adjunct 300, responsive to receipt of such instructions, supplies the caller's ANI to its associated database to obtain a copy of the subscriber's service record, e.g., record 401 (FIG. 2). Adjunct 300 then uses the speed dial codes to identify the telephone numbers that the caller wants to include in the conference connection.

More specifically, adjunct 300 unloads the telephone number (201-555-3372) specified for the first dial code (*3) from the record that it receives from its associated database, and then forms a conventional call set-up message containing, inter alia, the unloaded telephone number. The call set-up message also includes a call identifier and the identity of the path 301 voice channel that is to be used to extend the call connection from TS 220 to adjunct 300. TS 220, in turn and in a conventional manner, establishes a telephone connection from TS 220 to the station set associated with the specified telephone number (i.e., station set S2). TS 220 then extends the connection to adjunct 300 via the specified voice channel. Adjunct 300 then monitors the voice channel to determine when the call is answered (i.e., when station S2 is placed in an off-hook state). When that action occurs, then adjunct 300 advises the subscriber of that fact and then conferences the voice channel associated with the station S2 connection with the voice channel associated with the calling subscriber. Adjunct 300 then places a call to the next telephone number specified by the calling subscriber, namely 908-555-6008 associated with speed dial code *5. Similarly, when that call is answered, then adjunct 300 connects (bridges) the new call with the existing conference connection between station sets S1 and S2, all in accord with an aspect of the invention.

At that point, adjunct 300 monitors the voice channel assigned to the subscriber's call for additional instructions that the subscriber may enter, in accord with aspect of the invention. That is, if, during the conference call, the subscriber desires to add another station to the conference connection, then the subscriber may do so by entering (dialing) the appropriate instruction code and speed dial code identifying the telephone number of the station that is to be added to the existing conference connection. For example, assume that entry 407 (FIG. 2) specifies the telephone number and speed dial code for station S5 and assume that the subscriber desires to add that station to the existing conference connection. Then, all that the subscriber needs to do is to instruct adjunct 300 to do that which the subscriber desires. That is, the subscriber enters the instruction code to add another station to the connection, e.g., an instruction code of *c, followed by the appropriate speed dial code, e.g., *1. Adjunct 300, responsive to receipt of the instruction as result of monitoring the subscriber voice channel, unloads the corresponding telephone number (908-555-1234) from the subscriber's record and causes TS 220 to place a call thereto. Similarly, when the call is answered, then adjunct 300 adds the call to the existing conference connection, in accord with an aspect of the invention.

The subscriber may add still another station set to the conference connection by entering a further instruction (*c) followed by the speed dial code specified for the telephone number of the station set that is be added to the connection. If a speed dial code is not specified for the telephone number, then the subscriber may enter the telephone number rather than a speed dial code. For example, if station S6 is to be added to the connection, but the telephone number of station S6 is not contained in the subscriber's speed dial list, then subscriber may enter—*c#201-582-5555—to add station S6 to the conference connection, in which the latter number is assumed to be the telephone number associated with station S6, where the pound (#) is used to distinguish a speed dial code from a telephone number.

In an illustrative embodiment of the invention, adjunct 300 may include conventional voice detection and recognition apparatus—illustratively so-called word spotting apparatus—so that a subscriber may say the instruction for a conference connection. For example, the subscriber may say—"conference 3 and 5"—where the word "conference" serves to describe the function to be performed and 3 and 5 are the speed dial codes in which the word "and" serves as a delimiter. In this instance, adjunct 300 establishes a conference connection in the manner described above. As another example, the subscriber may say—"conference 3 and 5 and 1". Here the word "and", in each instance, serves as a delimiter between the speed dial codes of 3, 5 and 1. Alternatively, the subscriber may say the names of the people that are to be included in the conference call. For example, the caller may say "conference LarryB and John Smith" which is equivalent to saying "conference 3 and 5".

In an illustrative embodiment of the invention, a subscriber may arrange his/her record so that, in accord with an aspect of the invention, a number of speed dial codes may be stored "behind" a single code. To say it another way, a single speed dial code may be used to represent (specify) a plurality of speed dial codes. Record 408 (FIG. 2) is an example of one way a subscriber may specify such a feature. Specifically, if the caller enters "#c*23" then the program, responsive to field 404 of entry 408 containing speed dial codes, treats such contents as though the caller had dialed the string of speed dial codes. That is, the program stores a copy of the contents of field 404 in the aforementioned register and then proceeds to block 404-13 to establish the conference call specified by the caller. As another example, the caller may enter "#c*24" and the program, in response to that entry, establishes a conference call to the telephone numbers associated with speed dial codes 2, 4 and 5, as specified by entry 408.

A subscriber may administer his/her speed list by placing a call to adjunct 300 and entering the appropriate instruction upon hearing the second dial tone. For example, the caller, responsive to hearing the second dial tone may enter—a—to instruct adjunct 300 that the caller wants to administer the caller's associated speed dial list. Adjunct 300, in response to the instruction, obtains a copy of the caller's (subscriber's) speed dial list and announces each entry. After an entry is announced, the subscriber may then change the entry or scroll to a next entry by instructing (e.g., s)

adjunct 300 to do so. Adjunct 300 also allows the subscriber to add entries following the announcement of the last entry in the list. When the caller is done, then adjunct 300 stores the updated list in its associated database in place of the previous list.

Figure 3:
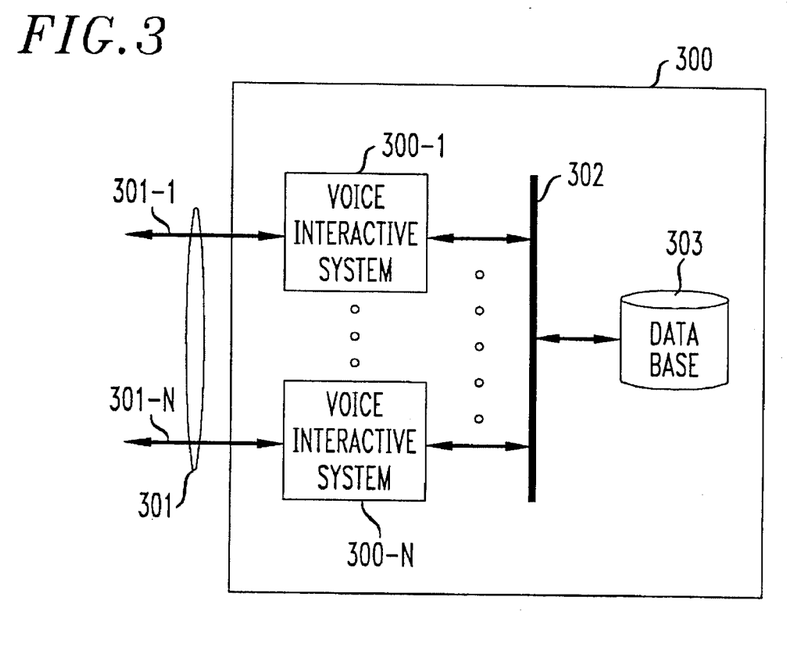
FIG. 3 is a broad block diagram of the adjunct of FIG. 1.
Figure 4:
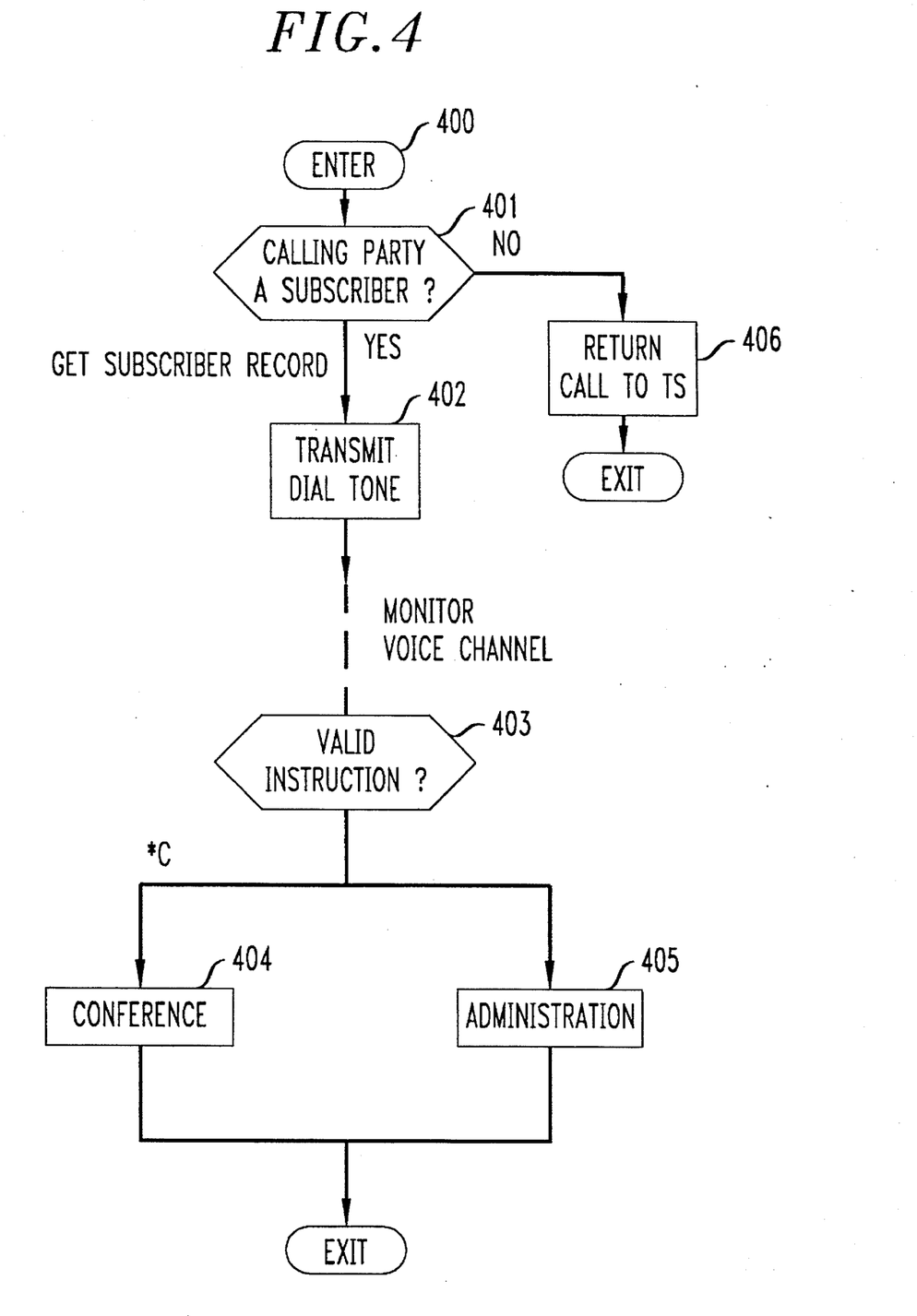
FIGS. 4–6 and 8 show in flow chart form an illustrative program which implements the principles of the invention in the adjunct of FIG. 1.

Turning now to FIG. 3, it is seen that adjunct 300 may include one or more interactive systems 300-1 through 300-N based on the level of traffic that it processes. (An interactive system 300 may be, for example, the CONVERSANT (trademark of AT&T) interactive voice information system available from AT&T.) Adjunct 300 also includes a conventional local area network 302 which interfaces systems 300-1 through 300-N with a conventional database 303. As mentioned above, subscriber records are stored in database 303. Each of the interactive systems 300-1 through 300-N may communicate with database 303 via local area network 302 for the purpose of accessing or updating a subscriber record.

Figure 5:
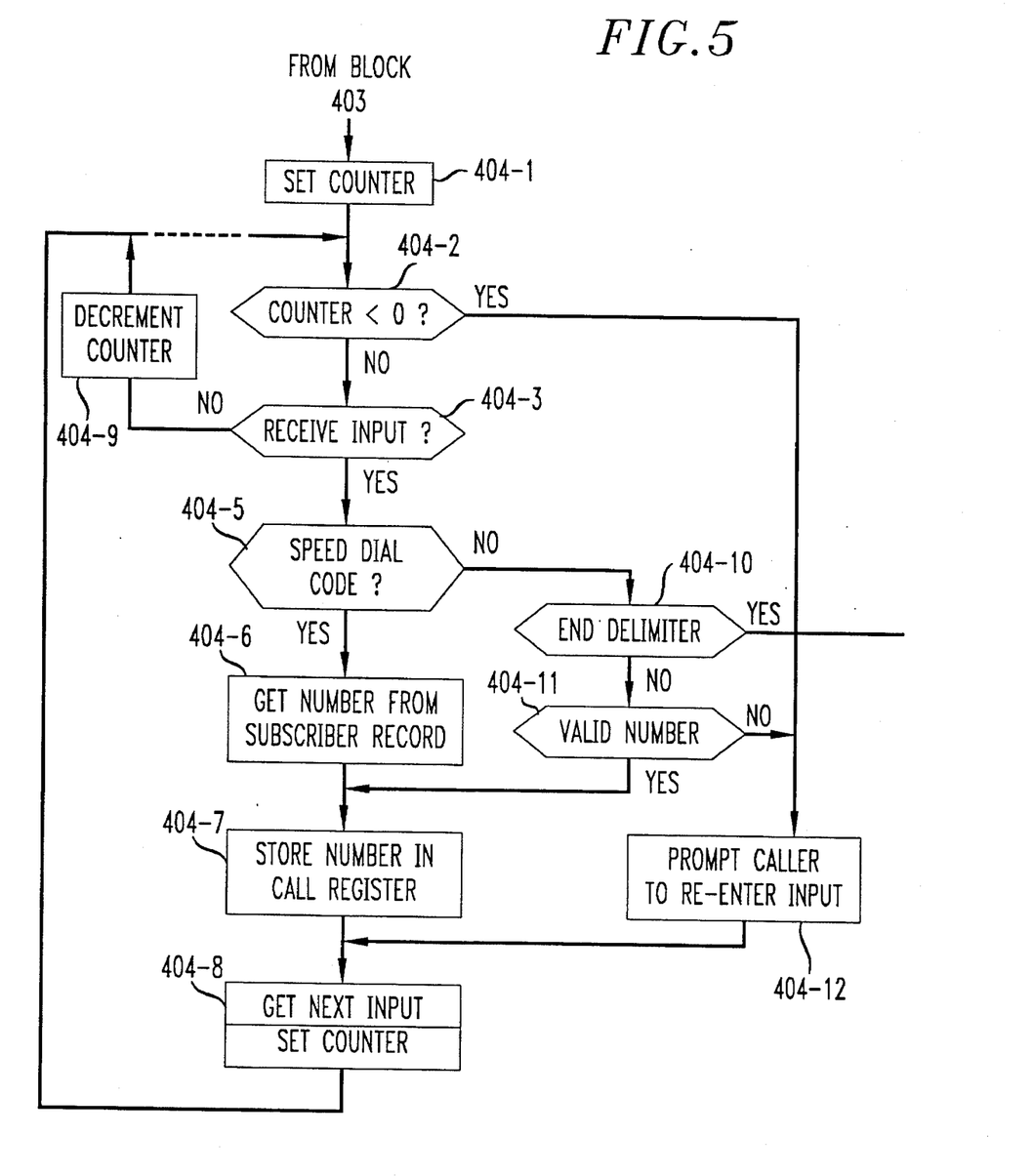
Figures 6, 7:
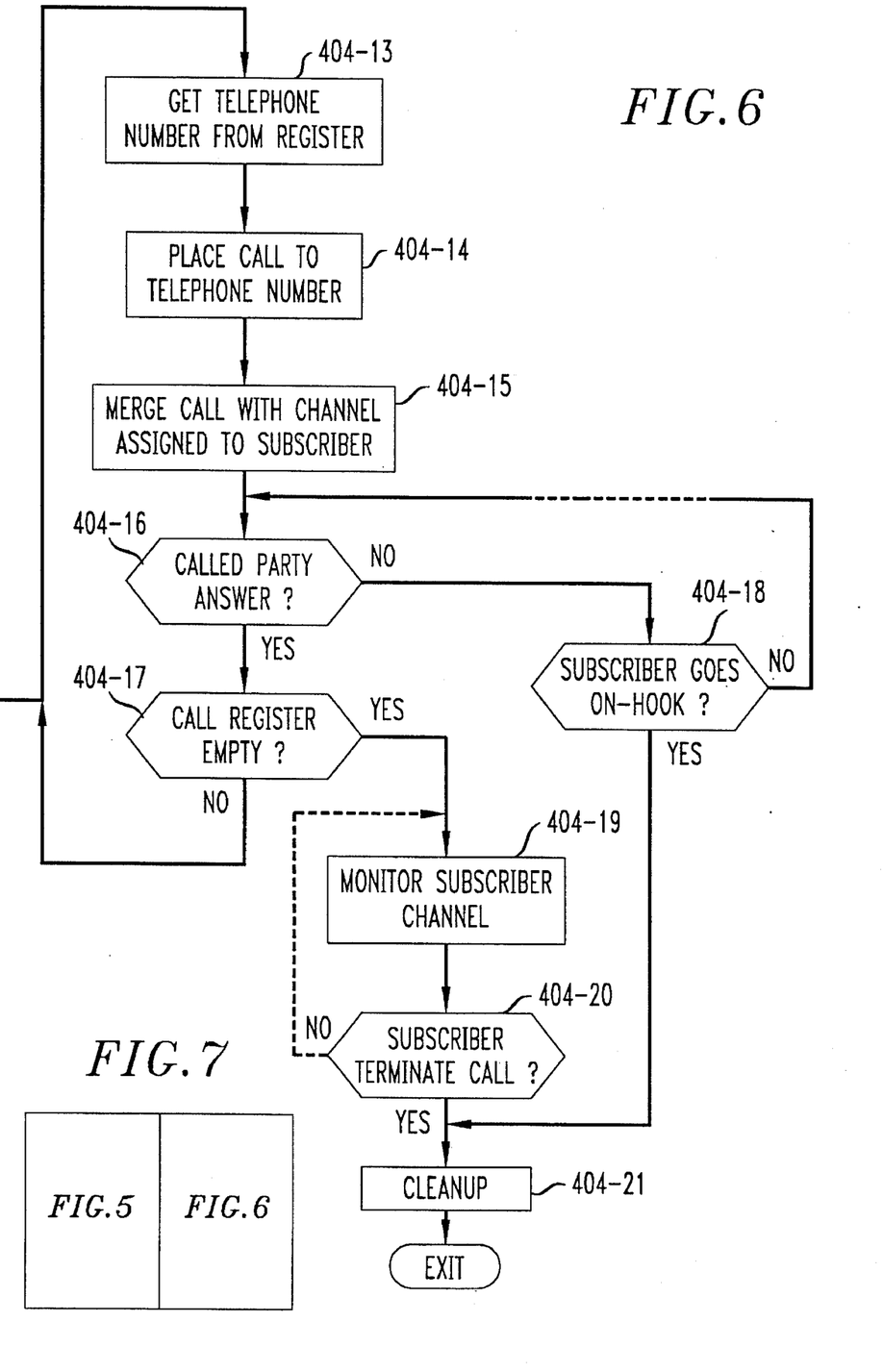
FIG. 7 shows how FIGS. 5 and 6 should be arranged with respect to one another.

Turning next to FIGS. 4–6 and 8 the program which implements the principles of the invention in a system 300 is entered at block 400 responsive to receipt of a call-set up message from the associated toll switch, e.g., TS 220. At that point, the program (block 401) checks to see (in the manner discussed above) if the calling party is a subscriber of the system 300 service. If not, then the program (block 406) returns control of the call to the toll switch and exits. If so, then the program (block 402) gets a copy of the subscriber's record (list of speed dial codes) and then supplies dial tone to the voice channel assigned to the calling subscriber. The program then monitors that channel for input, as represented by the dashed line. When such input is received, then the program at block 403 transfers to block 404 (405) if the input is *c (a). An expanded version of block 404 is shown in FIGS. 5 and 6**.

In particular, when entered, the program (block 404-1) sets a counter to a value that is indicative of an elapsed predetermined period of time (e.g., 8 seconds) when the contents of the counter has been decremented to zero. The program (block 404-2) then checks the counter to see if the content is equal to zero. If not, then program (block 404-3) checks to see if it has received any input from the caller. If not, then the program (block 404-9) decrements the counter and then exits to be reentered thereafter at block 404-2. In an illustrative embodiment of the invention, the reentry of the program at block 404-2 is a timed reentry, in which the timing is, e.g., 50 milliseconds. If the caller enters a speed dial code then the program (block 404-5) proceeds to block 404-6 where it gets the corresponding telephone number from the subscriber's record and stores it in a register (block 404-7) and then resets the counter (block 404-8) to monitor for the receipt of the next input (block 404-4). If the latter, then the program (block 404-10) checks the input to see if it represents an "end" delimiter. If so, then the program (FIG. 6) checks to see if it received a valid telephone number (seven or ten digit telephone number). If not, then the program prompts the caller/subscriber to reenter the input. Otherwise, the program proceeds to block 404-7.

If an "end" delimiter has been received then the program (block 404-13) gets a telephone number that had been stored in the aforementioned register and then places a call (block 404-14) to that number in the manner discussed above. The program (block 404-15) then merges the call with the call received from the subscriber. The program (block 404-16) monitors the aforementioned signaling channel for receipt of a so-called "answer supervision" message indicating that the called party answered the call. If such a message has not been received, then the program (block 404-18) checks to see if it received a message indicating that the calling subscriber terminated the call. If not, then the program returns to block 404-16 via a wait state that consumes a predetermined period of time, e.g., 50 milliseconds, as represented by the dashed line leaving the "No" leg of block 404-18. If the call is answered, then the program (block 404-17) checks the call register to see if it contains another telephone number and returns to block 404-13 if that is the case. Otherwise, the program assumes that the conference connection has been established and begins monitoring (block 404-19) the voice channel assigned to the subscriber's call. Such monitoring includes responding to the subscriber terminating the call connection by "hanging up" (block 404-20). If that is the case, then the program terminates all of the connections associated with the conference connection by sending appropriate instructions (block 404-21) to the associated toll switch via the aforementioned signaling channel. The program then terminates further processing of the subscriber's call.

In an illustrative embodiment of the invention, a subscriber may arrange his/her record so that, in accord with an aspect of the invention, a number of speed dial codes may be stored "behind" a single code. To say it another way, a single speed dial code may be used to represent (specify) a plurality of speed dial codes. Specifically, record 408 (FIG. 2) is an example of one way a subscriber may specify such a feature. Then, if the caller enters "#c*35" the program, responsive to field 404 of entry 408 containing speed dial codes, treats such contents as though the caller had dialed the string of speed dial codes. That is, the program stores a copy of the contents of field 404 in the aforementioned register and then proceeds to block 404-13 to establish the conference call specified by the caller. As another example, the caller may enter "#c*24" and the program, in response to that entry, stores a copy of the contents of the associated field 404 in the register and then establishes a conference call to the telephone numbers associated with speed dial codes 2, 4 and 5, as specified by entry 408.

Figure 8:
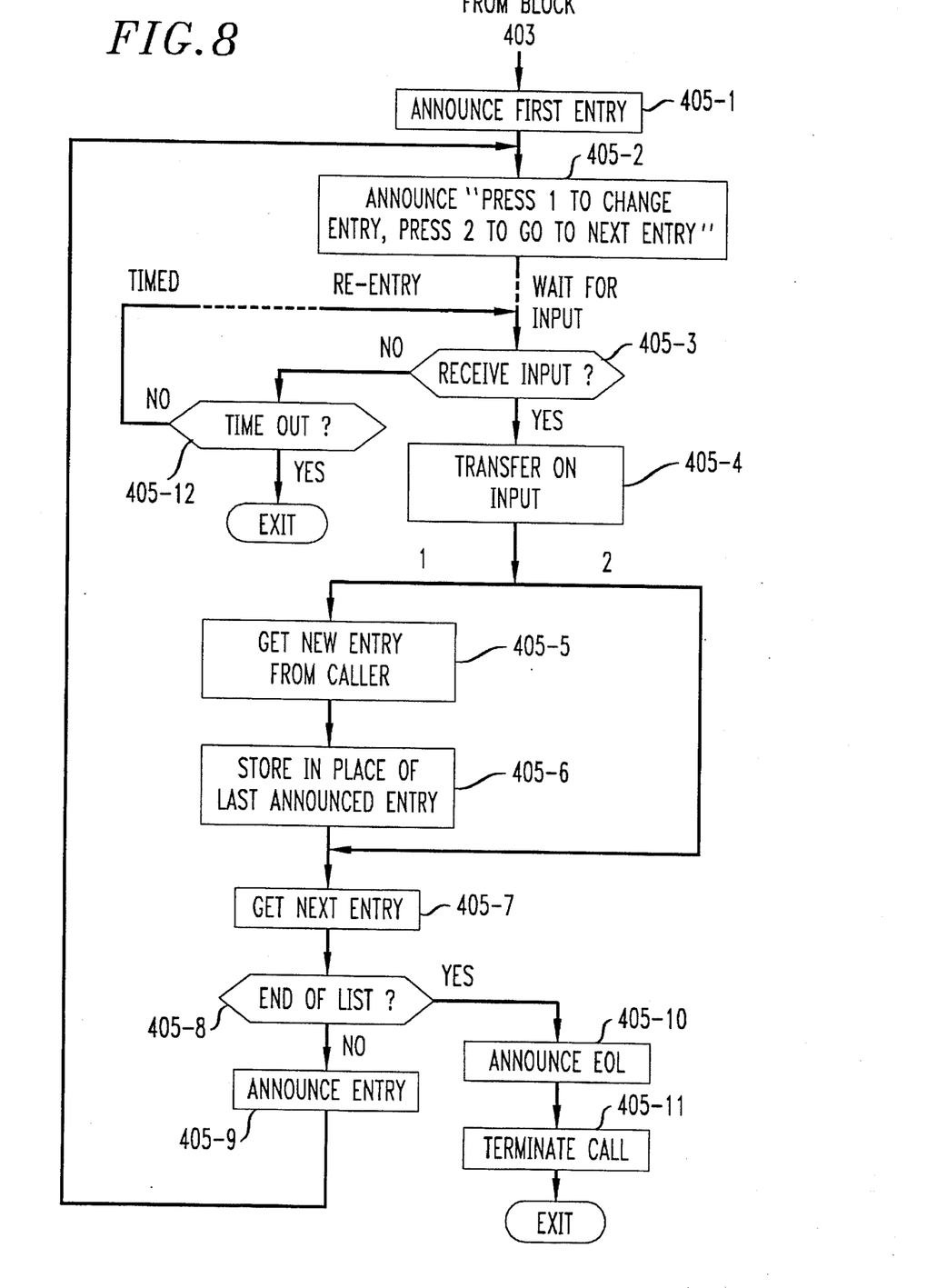

An expanded version of block 405 is shown in FIG. 8. Specifically, the program (block 405-1) announces the first entry in the subscriber's record (speed dial list) and then (block 405-2) prompts the subscriber to "press one to change the entry or press to go to the next entry." The program then waits for receipt of the subscriber's response to the prompt. That is, the program enters a loop (blocks 405-3 and 405-12) to wait for input from the subscriber. If the input is not received from the subscriber during the wait period, e.g., twenty seconds, then the program exits via block 405-12. If input is received during the wait period, then the program (block 405-4) transfers based on the value of the input, i.e., a value of one or two. For any other value, the program continues the wait period. If the input is one, then the program (block 405-5) gets the new entry as it is entered by the caller and stores (block 405-6) the new entry in the subscriber''s record in place of the last announced entry. The program (block 405-7) then gets the next entry in the subscriber record. If the entry is equal to an End of List (EOL) flag (block 405-8), then program (block 405-10) announces the EOL and then (block 405-11) stores the subscriber's record in the database, terminates the call and then exits. Otherwise, the program announces the entry (block 405-9) and then returns to block 405-2. If the caller enters a two, then the program proceeds to block 405-7.

The foregoing is merely illustrative of the principles of the invention. Those skilled in the art will be able to devise numerous arrangements, which, although not explicitly shown or described herein, nevertheless embody those principles that are within the spirit and scope of the invention. For example, the invention may be readily implemented in a local central office as well as a private branch exchange. Moreover, the invention may be implemented in a toll switch, thereby eliminating the need to provide adjunct 300.

The invention claimed is:

1. A method of establishing a conference connection in a telecommunications network comprising the steps of storing in memory for at least one subscriber a record containing a plurality of speed dial codes in association with respective telephone numbers and at least one code specifying a sequence of individual ones of said plurality of speed dial codes, responsive to receipt of a telephone call from said at least one subscriber and to receipt of said at least one code entered by said at least one subscriber, identifying said sequence and determining, as a function of the contents of said record, the telephone numbers associated with respective ones of the speed dial codes forming said sequence, and placing a telephone call, in turn, to each of the determined telephone numbers and merging each such call with the call received from said at least one subscriber to form said conference connection.

2. The method of claim 1 further comprising the step of responsive to receipt of a subsequent telephone call from said at least one subscriber and to receipt of a plurality of speed dial codes, placing, in turn, a telephone call to each of the telephone numbers respectively associated with the received speed dial codes.

3. The method of claim 2 wherein said subscriber enters each of said plurality of speed dial codes by saying an associated name which is processed such that an entered name is translated into the associated speed dial code.

4. Apparatus for establishing a conference connection in a telecommunications network comprising a memory for storing therein at least one subscriber record containing a plurality of speed dial codes and respective telephone numbers and at least one other speed dial code specifying a sequence of individual ones of said plurality of speed dial codes, means, responsive to receipt of a telephone call from a subscriber associated with said at least one record and to receipt of said at least one other speed dial code entered by said subscriber, for identifying said sequence as a function of said at least one other speed dial code, for determining, as a function of the contents of said record, the telephone numbers associated with respective ones of the speed dial codes forming said sequence, and means, responsive to said determining, for placing, in turn, a telephone call to each of the determined telephone numbers and merging each such call with the call received from said subscriber to form said conference connection.

5. The apparatus of claim 4 further comprising means, responsive to receipt of a subsequent telephone call from said subscriber and to receipt of a plurality of speed dial codes, for placing, in turn, a telephone call to each of the telephone numbers respectively associated with the received speed dial codes and conferencing the call with said conference connection.

6. The apparatus of claim 5 wherein said subscriber enters each of said plurality of speed dial codes by saying an associated name which is processed such that an entered name is translated into the associated speed dial code.

7. Apparatus for establishing a conference call in a telecommunications network comprising the steps of
means, responsive to receipt of a telephone call from a subscriber and receipt of a speed dial code via an associated call connection, for translating said received speed dial code into a sequence of other speed dial codes,
means for identifying telephone numbers associated with respective ones of said other speed dial codes, and
means for placing, in turn, a telephone call to each of said telephone numbers and conferencing each such call with said call from said subscriber.

* * * * *